United States Patent
Peeyush Kumar et al.

(10) Patent No.: US 12,556,886 B2
(45) Date of Patent: Feb. 17, 2026

(54) COMPUTE SYSTEM WITH DRIVER DISTRACTION DETECTION MECHANISM AND METHOD OF OPERATION THEREOF

(71) Applicant: TeleNav, Inc., Santa Clara, CA (US)

(72) Inventors: FNU Peeyush Kumar, Boston, MA (US); Maryam Asghari, Sharon, MA (US); Jianxin Gong, Houston, TX (US)

(73) Assignee: Telenav, Inc., Santa Clara, CA (US)

( * ) Notice: Subject to any disclaimer, the term of this patent is extended or adjusted under 35 U.S.C. 154(b) by 316 days.

(21) Appl. No.: 18/446,216

(22) Filed: Aug. 8, 2023

(65) Prior Publication Data
US 2025/0056188 A1    Feb. 13, 2025

(51) Int. Cl.
*H04W 4/029*    (2018.01)
*G10L 25/78*    (2013.01)
*H04W 4/02*    (2018.01)

(52) U.S. Cl.
CPC .......... *H04W 4/029* (2018.02); *H04W 4/026* (2013.01); *G10L 25/78* (2013.01)

(58) Field of Classification Search
CPC ....... H04W 4/02; H04W 4/024; H04W 4/025; H04W 4/026; H04W 4/027; H04W 4/029; H04B 1/38; H04B 1/3822; H04B 1/3827; B60W 40/08; B60W 40/09; B60W 40/10; B60W 40/105
See application file for complete search history.

(56) References Cited

U.S. PATENT DOCUMENTS

| | | | |
|---|---|---|---|
| 8,718,536 B2 * | 5/2014 | Hannon | H04W 4/021 455/1 |
| 9,460,601 B2 | 10/2016 | Mimar | |
| 9,505,412 B2 | 11/2016 | Bai et al. | |
| 10,674,005 B2 * | 6/2020 | Moir | H04W 4/025 |
| 10,757,248 B1 * | 8/2020 | Qian | H04W 4/025 |
| 10,759,441 B1 * | 9/2020 | Balakrishnan | H04W 4/02 |
| 11,203,294 B2 | 12/2021 | Pedersen | |
| 11,485,284 B2 | 11/2022 | Levkova et al. | |
| 2014/0139655 A1 | 5/2014 | Mimar | |
| 2015/0091740 A1 | 4/2015 | Bai et al. | |
| 2018/0086264 A1 | 3/2018 | Pedersen | |
| 2020/0331387 A1 | 10/2020 | Levkova et al. | |
| 2021/0284066 A1 | 9/2021 | Pedersen | |
| 2022/0032924 A1 | 2/2022 | Jeihani et al. | |
| 2022/0253941 A1 * | 8/2022 | Gouda | H04W 4/025 |

FOREIGN PATENT DOCUMENTS

WO    2020227212 A1    11/2020

* cited by examiner

*Primary Examiner* — Quochien B Vuong
(74) *Attorney, Agent, or Firm* — Perspectives Law Group, Corp.

(57) ABSTRACT

A method of operation for a compute system comprising: monitoring a phone sensor array to detect a trigger; calculating a position of a cell phone based on the trigger and sensor data from the phone sensor array; predicting a driver distraction event by analyzing the sensor data and the position of the cell phone; compiling a driver distraction evaluation based on the driver distraction event and a sensor data packet from an in-vehicle sensor array; generating a distraction rating for display on a device based on the driver distraction evaluation.

20 Claims, 6 Drawing Sheets

COMPUTE SYSTEM WITH DRIVER DISTRACTION DETECTION MECHANISM AND METHOD OF OPERATION THEREOF

TECHNICAL FIELD

An embodiment of the present invention relates generally to a compute system, and more particularly to a system with a driver distraction detection mechanism.

BACKGROUND ART

Modern driving is full of distractions. With increased traffic congestion, cell phone calls, texts, and navigation instructions bombarding the driver, distracted driving has risen to a major cause of traffic accidents. When these events occur concurrently, the driver can be overwhelmed and be distracted for just an instant. Research and development in the existing technologies can take a myriad of different directions.

Thus, a need still remains for a compute system with a driver distraction detection mechanism to monitor and identify distracted driving. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a compute system including: monitoring a phone sensor array to detect a trigger; calculating a position of a cell phone based on the trigger and sensor data from the phone sensor array; predicting a driver distraction event by analyzing the sensor data and the position of the cell phone; compiling a driver distraction evaluation based on the driver distraction event and a sensor data packet from an in-vehicle sensor array; and generating a distraction rating for display on a device based on the driver distraction evaluation.

An embodiment of the present invention provides a compute system, including a processor circuit configured to: monitor a phone sensor array to detect a trigger; calculate a position of a cell phone based on the trigger and sensor data from the phone sensor array; predict a driver distraction event by analysis of the sensor data and the position of the cell phone; compile a driver distraction evaluation based on the driver distraction event and a sensor data packet from an in-vehicle sensor array; and generate a distraction rating for display on a device based on the driver distraction evaluation.

An embodiment of the present invention provides a non-transitory computer readable medium including instructions for a compute system, including: monitoring a phone sensor array to detect a trigger; calculating a position of a cell phone based on the trigger and sensor data from the phone sensor array; predicting a driver distraction event by analyzing the sensor data and the position of the cell phone; compiling a driver distraction evaluation based on the driver distraction event and a sensor data packet from an in-vehicle sensor array; and generating a distraction rating for display on a device based on the driver distraction evaluation.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
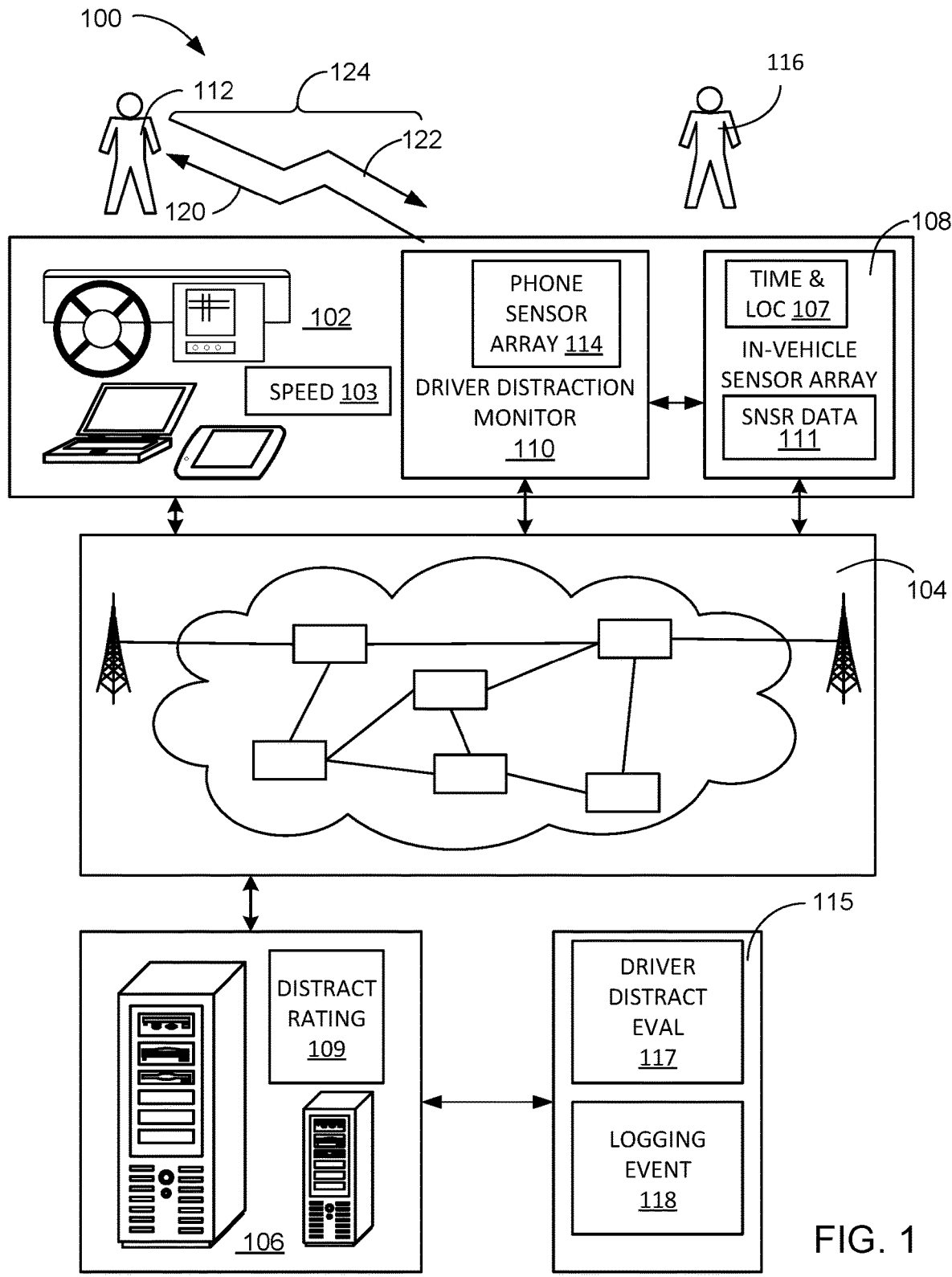
FIG. 1 is a compute system with a driver distraction detection mechanism in an embodiment of the present invention.

The following embodiments can utilize vehicle sensors, environmental sensors, and cell phone monitoring sensors to determine a driver distraction detection by the driver while operating or controlling physical movement of a vehicle. The vehicle movement control can be based on a detection of vehicle use by the vehicle sensors, and interaction with the cell phone as determined by cell phone monitoring sensors.

The vehicle movement control can further be based on the cognitive load corresponding to a real-time state or status of a geographic area, including representations, locations, statuses, or a combination thereof of one or more vehicles in the geographic area. The driver distraction of the driver can be based on vehicle data for representing status of a reporting vehicle or device, the cell phone sensor data for representing sensor data associated with an environment or a surrounding of the reporting device, or a combination thereof.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for case of description generally show similar orientations, this depiction in the figures is arbitrary for the most part. Generally, the invention can be operated in any orientation.

One skilled in the art would appreciate that the format with which cell phone information is expressed is not limiting to some embodiments of the invention. For example, in some embodiments, cell phone position information is presented in the format of (X, Y, Z); where X and Y and Z are three coordinates that define the geographic location, i.e., a position of the cell phone of a user.

The term "driver distraction" referred to herein can include factors that affect a driver's attention during periods of activity, including performing planned maneuvers, dealing with non-call use of the cell phone, reaction to maneuvers detected by the vehicle sensors, making inquiries of the in-vehicle infotainment system, and interacting with the cell phone while the vehicle is in motion. An increase in the driver distraction can increase the probability that the driver will miss an instruction or increase the risk of an accident. The term "infotainment system" can include circuits and systems that can provide navigation instructions, music, point-of-interest identification and support, cell phone/text to voice interaction, vehicle alert notifications, or a combination thereof.

Many embodiments described can take the form of computer-executable or controller-executable instructions, including routines executed by a programmable computer or controller. Embodiments can be practiced on computer or controller systems other than those shown and described. The techniques described herein can be embodied in a special-purpose computer or data processor that can be programmed, configured, or implemented to execute one or more of the computer-executable instructions described below. Accordingly, the terms "computer" and "controller" as generally used herein refer to any processor and can include Internet appliances and handheld devices, including palm-top computers, wearable computers, cellular or mobile phones, multi-processor systems, processor-based or programmable consumer electronics, network computers, mini computers, and the like. Information handled by these computers and controllers can be presented at any suitable display medium. Instructions for executing computer- or controller-executable tasks can be stored in or on any computer-readable medium, including hardware, firmware, or a combination thereof. Instructions can be included in any memory device, including, for example, a flash drive or USB device.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

The term "module" referred to herein can include or be implemented as or include software running on specialized hardware, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a "module" or "unit" is written in the system claims section below, the "module" or "unit" is deemed to include hardware circuitry for the purposes and the scope of the system claims.

The modules or units in the following description of the embodiments can be coupled or attached to one another as described or as shown. The coupling or attachment can be direct or indirect without or with intervening items between coupled or attached modules or units. The coupling or attachment can be by physical contact or by communication between modules or units, such as wireless communication.

It is also understood that the nouns or elements in the embodiments can be described as a singular instance. It is understood that the usage of singular is not limited to singular but the singular usage can be applicable to multiple instances for any particular noun or element in the application. The numerous instances can be the same or similar or can be different. It is also understood that nouns or elements described as plural can be utilized without limitation as singular as well.

Referring now to FIG. 1, therein is shown a compute system 100 with a driver distraction detection mechanism in an embodiment of the present invention. The compute system 100 can include a first device 102, such as a client or a server, coupled to a second device 106, such as a client or server. The first device 102 can monitor a speed 103 of travel during operation of the first device 102.

The compute system 100 can include a system for analyzing information provided by an in-vehicle sensor array 108, a driver distraction monitor 110, a phone sensor array 114, or a combination thereof. The first device 102 can communicate with the second device 106 through a network 104, such as a wireless or wired network.

For example, the first device 102 can be of any of a variety of computing devices, such as a cellular phone, personal digital assistant, a notebook computer, a wearable device, internet of things (IoT) device, automotive telematics system, or other multi-functional device. Also, for example, the first device 102 can include a device or a sub-system, an autonomous or self-maneuvering vehicle or object, a manually controlled vehicle, a remote-controlled vehicle or object, or a combination thereof.

The first device 102 can couple, either directly or indirectly, to the network 104 to communicate with the second device 106 or can be a stand-alone device. The first device 102 can further be separate form or incorporated with a vehicle, such as a car, truck, bus, or train.

For illustrative purposes, the compute system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices, or high-definition video processing devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the compute system 100 is described with the second device 106 as a non-mobile computing device, although it is understood that the second device 106 can be different types of computing devices. For example, the second device 106 can also be a mobile computing device, such as notebook computer, another client device, a wearable device, or a different type of client device. The second device 106 can be a standalone device, or can be incorporated with a vehicle, such as a car, a truck, a bus, or a train.

Also, for illustrative purposes, the compute system 100 is described with the second device 106 as a computing device, although it is understood that the second device 106 can be different types of devices. Also, for illustrative purposes, the compute system 100 is shown with the second device 106 and the first device 102 as end points of the network 104, although it is understood that the compute system 100 can include a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

The compute system 100 can provide additional features that are not available in prior art driver distraction detection systems. The first device 102 can include a driver distraction monitor 110 and an in-vehicle sensor array 108. The driver distraction monitor 110 can be software executed on a specific hardware platform, implemented in hardware, or a combination thereof to evaluate the timing for delivery and receipt of information between the compute system 100 and a user 112, while the first device 102 is operated. The driver distraction monitor 110 can receive detailed information from the in-vehicle sensor array 108 of the first device 102 in order to evaluate the amount of distraction the user 112 is experiencing.

The in-vehicle sensor array 108 provides detailed information about the operation of the first device 102 and obstacles or vehicles operating in the area of the first device 102. For example, the in-vehicle sensor array 108 can provide timely details about the operation and current state of the first device 102. The in-vehicle sensor array 108 can be coupled to the driver distraction monitor 110 in order to access a sensor data packet 111. By way of an example, the sensor data packet 111 can provide the information captured by the in-vehicle sensor array 108, including wandering of the first device 102, variations in speed 103 of the first device 102, proximity to obstacles, and a time and location 107 of the information that was captured by the in-vehicle sensor array 108 and recorded in the driver distraction monitor 110. The sensor data packet 111 can include the current position of the first device 102, the current status of the operation of the first device 102, and conditions surrounding the first device 102. The driver distraction monitor 110 can monitor the timing of communication between the user 112 and the compute system 100 to detect a distraction rating 109 of the user 112.

The compute system 100 can be operated by the user 112. The user 112 can include a person or an entity accessing or utilizing the compute system 100 or a device therein. For example, the user 112 can include a person operating the first device 102, and designated as a driver 112. The compute system 100 can also monitor a passenger 116 that can interact with the compute system 100 that might increase the distraction rating 109 of the driver 112.

The compute system 100 can further process the phone sensor array 114 from the user 112 or the passenger 116. The phone sensor array 114 can be gravity sensors, magnetometers, accelerometers on a specific hardware platform, implemented in hardware, coordinated by software, or a combination thereof. The phone sensor array 114 can be configured to analyze interaction between the phone sensor array 114 and the user 112 or the passenger 116. The phone sensor array 114 can be accessed by or from the user 112 directly to or indirectly on the first device 102. The phone sensor array 114 can process the input or the stimulus directly for or related to a corresponding software, application, feature, or a combination thereof.

The phone sensor array 114 can be managed by and transfer information to the driver distraction monitor 110 in order to capture the timing of an audio interaction 124 between the user 112 and the compute system 100. The audio interaction 124 can be music requested by the user 112, a navigation instruction 120, a user response 122, or other exchanges. As an example, the navigation instruction 120 can be other audio communications, including music, clarification requested for requested services, alert or warning statements of the distraction rating 109 of the first device 102, or warning of road conditions, speed limit changes, as well as instructions to navigate the first device 102. The user response 122 can include requests for information on points-of-interest, services, accommodations, and clarification to previous requests a call or non-call application. By way of an example, the audio interaction 124 can include the user 112 requesting a parking reservation, initiating a conference call, or accessing a podcast. While the audio interaction 124 are benign on their own, they can add to the distraction rating of the user 112 and impair the safety of the first device 102 if delivered during occurrences of increased activity of the user 112.

By way of an example, the user 112 can request directions to a gas station nearby. The phone sensor array 114 can receive the request through the user response 122 and pass the request to the driver distraction monitor 110 for processing. When the driver distraction monitor 110 identifies the directions to the nearby gas station, the navigation instruction 120 can be passed back to the phone sensor array 114 for announcement to the user 112. During this process, the user 112 can maintain attention to controlling the first device 102 and any obstacles that might force evasive maneuvers of the first device 102, thus monitoring the distraction of the user 112 and improving safety.

The second device 106 can support the driver distraction monitor 110 by analyzing the distraction rating 109. The second device 106 can receive the distraction rating 109 and the sensor data packet 111 from the first device 102 through the network 104. The second device 106 can process the distraction rating 109 and the sensor data packet 111 in order to produce a driver distraction evaluation 117.

The second device 106 can process the distraction rating 109 and the sensor data packet 111 in order to produce the driver distraction evaluation 117. By way of an example, the second device 106 can verify the distraction rating 109 and the sensor data packet 111 by checking the time and location 107 information in order to identify that it represents a logging event 118. The combination of the navigation instruction 120 and the user response 122 is considered a physical contact 122 or an audio interaction 124 that can be monitored by the phone sensor array 114.

The driver distraction evaluation 117 can evaluate the degree of distraction that the driver 112 is experiencing. The distraction rating 109 indicates that the driver 112 has engaged in distraction events that reduce the concentration of the driver 112. By evaluating the sensor data packet 111, the driver distraction evaluation 117 can determine the changes in a lane position, variation in speed 103 of the vehicle 102, and proximity to obstructions while driving to assess the risk posed by the distraction of the driver 112.

The second device 106 can be coupled to a driver distraction artificial intelligence 115, such as a trigger qualification feeding a convolutional neural network for evaluating the level of driver distraction experienced during a trip, while operating the first device 102. The driver distraction artificial intelligence 115 can evaluate the distraction rating 109 to determine whether it is significant to the operation of the first device 102.

By way of an example, the logging event 118 can be an indicator of the amount of distraction experienced by the driver 112 during a trip. When the user 112 interacts with the phone sensor array 114 for periods of time 107 exceeding eight seconds, the driver distraction artificial intelligence 115 can predict a minor distraction, but when the user 112 interacts with the phone sensor array 114 for periods of time 107 exceeding 20 seconds, the driver distraction artificial intelligence 115 can log the event as driver distraction and save the event to the second device 106, such as a cloud server 106.

It is understood that the passenger 116 can interact with the phone sensor array 114 without increasing the distraction rating 109 of the user 112. In the event the passenger 116 does distract the user 112, the in-vehicle sensor array 108 can detect variations in speed 103, changes in lane position, proximity to obstructions, or a combination thereof.

Figure 2:
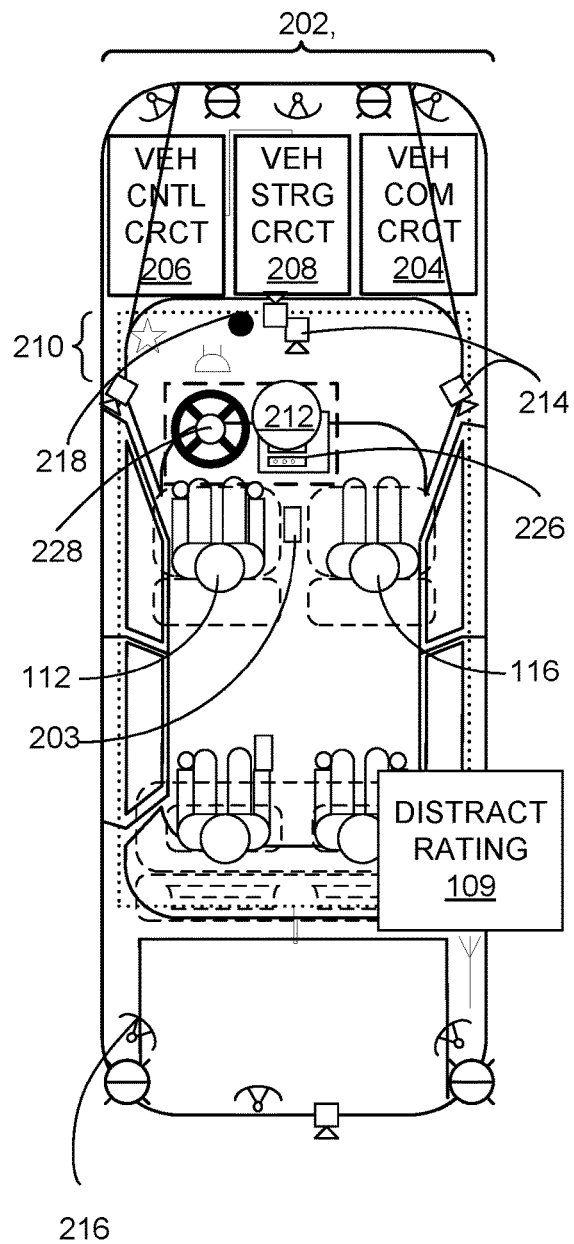
FIG. 2 is an example of a top diagrammatical view of various devices for implementing the compute system.
Figure 2:
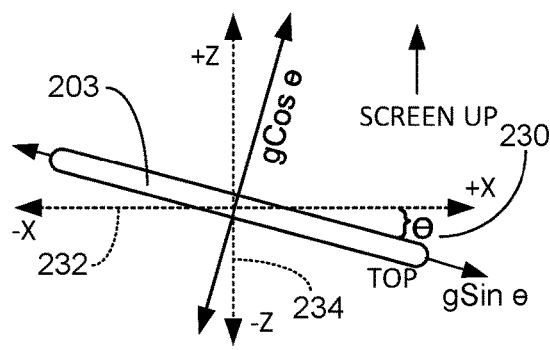

Referring now to FIG. 2, therein is shown an example of a top plan view illustration of various devices for implementing the compute system 100 of FIG. 1. The compute system 100 can include or interact with a vehicle 202.

The vehicle 202 is an object or a machine used for transporting people or goods capable of automatically maneuvering or operating the object or the machine. The vehicle 202 can include vehicles accessible by the user 112 of FIG. 1 for control, maneuver, operation, or a combination thereof. For example, the vehicle 202 can include a car, a truck, a cart, a drone, or a combination thereof.

The vehicle 202 can further be controlled or maneuvered without the phone sensor array 114 of FIG. 1 corresponding to the maneuver or the movement. For example, the vehicle 202 can include automatic maneuvering features, such as smart cruise control or preventative breaking. The vehicle 202 can be operated by the user 112 taking advantage of the phone sensor array 114 to provide monitoring of usage of a cell phone 203 during operation of the vehicle 202.

The in-vehicle sensor array 108 of FIG. 1 can provide a status, a state, a setting, a description, or a combination thereof regarding the first device 102 of FIG. 1 or the vehicle 202 itself. The in-vehicle sensor array 108 can further provide information describing or representing surroundings or environment of the first device 102 or the vehicle 202 during the operation of the vehicle 202. For example, the in-vehicle sensor array 108 can provide speed limit data, accessory or feature status, sensor data, traffic data, road condition data, options for the user response 122 of FIG. 1, or a combination thereof.

Also, for example, the in-vehicle sensor array 108 can provide an accessory status 226. The accessory status 226 can represent or describe a state of a circuit, a function, a feature, or a combination thereof for the vehicle 202. As a more specific example, the accessory status 226 can include an on-off state, a level or magnitude, or a combination thereof for lights, environmental settings, door or trunk, windshield wipers, communication settings, braking system, steering direction, signal indicator, or a combination thereof for the vehicle 202.

The vehicle 202 interfacing with the compute system 100 can include a device, a circuit, one or more specific sensors, such as environmental sensors 210, or a combination thereof for providing assistance or additional information to the user 112 controlling, maneuvering, or operating the vehicle 202. The vehicle 202 or any other vehicles can include a vehicle communication circuit 204, a vehicle control circuit 206, a vehicle storage circuit 208, other interfaces, or a combination thereof.

The vehicle storage circuit 208 can include a functional unit or circuit integral to the corresponding control vehicle and configured to store and recall information, including the distraction rating 109, the vehicle status, the sensor data packet 111 of FIG. 1, system status, or a combination thereof. The vehicle storage circuit 208 can be a volatile memory, a nonvolatile memory, an internal memory, an external memory, or a combination thereof. For example, the vehicle storage circuit 208 can be a nonvolatile storage such as non-volatile random access memory (NVRAM), Flash memory, disk storage, or a volatile storage such as static random access memory (SRAM). The vehicle storage circuit 208 can record simultaneous streams from the in-vehicle sensor array 108, including a visual sensor 214, such as a high-definition camera sensor 214, a radar sensor 216, an accessory sensor 218, or a combination thereof. The separate streams can be combined to generate the sensor data packet 111. The components of the in-vehicle sensor array 108 are discussed in further detail below.

The vehicle storage circuit 208 can store vehicle software, other relevant data, such as input information, information from sensors, processing results, information predetermined or preloaded by the compute system 100 or vehicle manufacturer, or a combination thereof. The vehicle storage circuit 208 operates as the primary storage for the vehicle control circuit 206.

The vehicle control circuit 206 can include a function unit or circuit integral to the vehicle 202 and configured to execute or implement instructions. The vehicle control circuit 206 can execute or implement the vehicle software to provide the intelligence of the vehicle 202, the compute system 100, or a combination thereof.

The vehicle control circuit 206 can be implemented in a number of different manners. For example, the vehicle control circuit 206 can be a processor, an application specific integrated circuit (ASIC), an embedded processor, a microprocessor, a hardware control logic, a hardware finite state machine (FSM), a digital signal processor (DSP), or a combination thereof. As a more specific example, the vehicle control circuit 206 can include an engine control unit, one or more central processing unit, or a combination thereof. The vehicle control circuit 206 can communicate with other components of the vehicle 202 or the second device 106 of FIG. 1 through the vehicle communication circuit 204.

The vehicle communication circuit 204 can include a functional unit or circuit integral to the vehicle 202. The vehicle communication circuit 204 can be configured to enable external communication to and from the vehicle 202. For example, the vehicle communication circuit 204 can permit the vehicle 202 to communicate with the first device 102, the second device 106 of FIG. 1, or a combination thereof.

The vehicle communication circuit 204 can also function as a communication hub allowing the vehicle 202 to function as part of the network 104 and not limited to be an end point or terminal circuit to the network 104. The vehicle communication circuit 204 can include active and passive components, such as microelectronics, semiconductor devices, or an antenna, for interaction with the network 104. For example, the vehicle communication circuit 204 can include a modem, a transmitter, a receiver, a port, a connector, or a combination thereof for wired communication, wireless communication, or a combination thereof.

The vehicle communication circuit 204 can couple with the network 104 to send or receive information directly between the vehicle communication circuit 204 and the first device 102, the second device 106, or a combination thereof as end points of the communication, such as for direct line-of-sight communication or peer-to-peer communication. The vehicle communication circuit 204 can further couple with the network 104 to send or receive information through a server or another intermediate device in between endpoints of the communication.

The vehicle 202 or other vehicles can further include various interfaces. The vehicle 202 can include one or more interfaces for interaction or internal communication between functional units or circuits of the vehicle 202. For example, the vehicle 202 can include one or more interfaces, such as drivers, firmware, wire connections or buses, protocols, or a combination thereof, for the vehicle storage circuit 208, the vehicle control circuit 206, or a combination thereof.

The vehicle 202 can further include one or more interfaces along with switches or actuators for physically controlling movable components of the vehicle 202. For example, the vehicle 202 can include the one or more interfaces along with the controlling mechanisms to physically perform and control the maneuvering of the vehicle 202, such as for manual steering, smart cruise control, or maneuvering features.

The functional units or circuits in the vehicle 202 can work individually and independently of the other functional units or circuits. The vehicle 202 can work individually and independently from the first device 102, the network 104, the second device 106, other devices or vehicles, or a combination thereof.

The functional units or circuits described above can be implemented in hardware. For example, one or more of the functional units or circuits can be implemented using a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

The environmental sensors 210 are each a device or a circuit for detecting or identifying environment of the corresponding vehicle. The environmental sensors 210 can detect, identify, determine, or a combination thereof, such as for status, surroundings or movement for the corresponding vehicle. The environmental sensors 210 can detect, identify, determine, or a combination thereof for environment within a cabin of the vehicle 202, an environment external to and surrounding the vehicle 202, or a combination thereof. The environmental sensors 210 can be implemented for the vehicle 202, the cell phone 203, the first device 102, or a combination thereof.

For example, the environmental sensors 210 can include a location-movement sensor 212, the visual sensor 214, such as the high-definition camera sensor 214, the radar sensor 216, the accessory sensor 218, or the combination thereof. The location-movement sensor 212 can include a sensor for identifying or calculating a geographic location of the vehicle 202 or the first device 102, determining a movement or speed 103 of FIG. 1 of the vehicle 202 or the first device 102, physical movement of the cell phone 203, or a combination thereof. The location-movement sensor 212 can include an accelerometer, a speedometer, a Global Positioning System (GPS) receiver or device, a gyroscope or a compass, or a combination thereof. The vehicle 202 can include the environmental sensors 210 other than or in addition to the location-movement sensor 212 that can provide lane information to aid in the identification of the position of the vehicle 202. The location movement sensor 212 can monitor lane position and speed 103 as part of distraction rating 109 during operation of the vehicle 202.

The visual sensor 214 can include a sensor for detecting or determining visual information representing the environment within and external to and surrounding of the vehicle 202, including the high-definition camera sensor 214. The visual sensor 214 can include a camera attached to or integral with the vehicle 202 or the first device 102. For example, the visual sensor 214 can include a camera, such as forward facing camera, a rear-view or back-up camera, a side-view or a blind-spot camera, an interior cabin camera, or a combination thereof for detecting obstructions proximate the vehicle. Also, for example, the visual sensor 214 can include an infrared sensor or a night vision sensor.

The visual sensor 214 can further include a camera on the first device 102 or another user device of the user 112 connected to and interacting with the vehicle 202. The visual sensor 214 can further include the interior cabin camera for detecting or determining visual information inside the vehicle 202 or cabin of the vehicle 202. The visual sensor 214 operating as the cabin camera can monitor a stress level or attention of the user 112 while the vehicle 202 is in operation. The visual sensor 214 can be a high-definition camera that supports the JPEG2000 standard or better. The visual sensor 214 will have a minimum 4096×4096 pixels density for creating the sensor data packet 111 of FIG. 1.

The radar sensor 216 can include an object-detection system, device, or circuit. The radar sensor 216 can determine or identify an existence of an object or a target, such as an obstacle proximate the vehicle 202, external to the first device 102 or the vehicle 202, a relative location or a distance between the object or the target and the first device 102 or the vehicle 202, or a combination thereof.

The radar sensor 216 can utilize radio waves to determine or identify an existence of the object or the target, the relative location or a distance relative to the vehicle 202 or the first device 102, or a combination thereof. For example, the radar sensor 216 can include a proximity sensor or warning system, such as for an area in front of, behind, adjacent to or on a side of, or a combination thereof geographically or physically relative to the vehicle 202.

The accessory sensor 218 can include a sensor for determining or detecting a status of a subsystem or a feature of the first device 102 or the vehicle 202. The accessory sensor 218 can determine or detect the status or a setting for windshield wipers, turn signals, gear setting, headlights, steering wheel direction, brake pressure, speed 103, acceleration, or a combination thereof of the vehicle 202.

The compute system 100 can use one or more of the environmental sensors 210 corresponding to one or more devices, one or more of the vehicle 202, or a combination thereof to generate the route detail 109 describing or representing information regarding the environment within or surrounding the corresponding device or the vehicle 202. The route detail 109 can be further processed with the vehicle control circuit 206, stored in the vehicle storage circuit 208, communicated to another device or vehicle through the vehicle communication circuit 204, or a combination thereof.

As a more specific example, the vehicle communication circuit 204, the vehicle control circuit 206, the vehicle storage circuit 208, the environmental sensors 210, one or more interfaces, or a combination thereof can be included in or make up the first device 102 included in or integral with the vehicle 202. Also, as a more specific example, the vehicle 202 can include or be integral with the first device 102, including an embedded navigation system, an infotainment system, a smart driving or a driver assistance system, a self-driving or a maneuvering system for the vehicle 202, or a combination thereof.

The compute system 100 can control, maneuver, generate signals or navigation instructions corresponding thereto, or a combination thereof for the vehicle 202 based on the currently occupied or travelled lane. The compute system 100 can further generate or process the vehicle movement control 228 based on the manual input from the user 112.

The compute system 100 can process the vehicle movement control 228 for controlling or maneuvering the vehicle 202. The vehicle movement control 228 is an instruction, a signal, a process, a method, a mechanism, or a combination thereof directing or controlling physical movement or travel of the vehicle 202.

For example, the compute system 100 can monitor the vehicle movement control 228 for maneuvering or controlling the vehicle 202 based on or according to the travel-lane of the vehicle 202 and specific to the traffic lane occupied or being traversed by the vehicle 202.

The compute system 100 can communicate the distraction rating 109 between the second device 106, the first device 102, the network 104, the vehicle 202, the cell phone 203, or a combination thereof. For an illustrative example, the compute system 100 can include the first device 102 within the vehicle 202 with the group of vehicles within a predetermined distance, relatively located according to a predetermined arrangement, or a combination thereof.

Continuing with the example, the compute system 100 can utilize the distraction rating 109 to provide information, evaluate maneuvering, or a combination thereof for other vehicles, such as the separate vehicle including another instance of the vehicle 202, or a combination thereof. The compute system 100 can communicate the distraction rating 109 directly from the second device 106 or through the first device 102 to the vehicle 202 for processing and storage.

Continuing with the example, the compute system 100 can communicate the distraction rating 109 through the second device 106 to other devices or vehicles, or directly communicate to the other devices or vehicles, such as for a peer-to-peer communication system. The compute system 100 can communicate the distraction rating 109 for informing other devices about performance of the user 112 of the vehicle 202, or a combination thereof.

The cell phone 203 can access the phone sensor array 114 of FIG. 1 in order to identify a fixed position of the cell phone 203 during operation of the vehicle 202. By way of an example, calculating the position of the cell phone 203 can be performed from gravity sensors (not shown) that can be used to calculate the tilt angle θ 230 from an X axis 232. The gravity sensor for the X axis 232 will present a value of g Sin θ, where g is the force of gravity. The gravity sensor for a Z axis 324 will present a value of g Cos θ. In order to calculate the tilt angle θ 230:

$$\theta = \operatorname{Sin}^{-1}\left(\frac{-G_x}{g}\right) \quad \text{(EQ 1)}$$

Where $G_x$ is the reading of the gravity sensor of the X axis 232 and g is the gravity constant.

The phone sensor array 113 can monitor for changes in the tilt angle θ 230 to determine if the cell phone 203 is accessed. The driver distraction artificial intelligence 115 of FIG. 1 can establish thresholds and trigger conditions that can separate accidental vibration from intentional contact with the cell phone 203. The gravity sensor reading at time t 107 of FIG. 1 can be defined as:

$$G_t = (G_t^x, G_t^y, G_t^z) \quad \text{(EQ2)}$$

Where $G_t^x$ is the gravity sensor for the X-axis of the cell phone 203; $G_t^x$ is the gravity sensor for the Y-axis of the cell phone 203; and $G_t^z$ is the gravity sensor for the Z-axis of the cell phone 203.

The trigger for detecting movement of the cell phone 203 can be defined by:

$G_t$, $G_{t+\Delta t}$, deviation=5, where $\Delta t$=500 ms

It is understood that the trigger is composed of the gravity sensors of all three axis. The deviation=5 is the combination of the three gravity sensors. Since the response for the gravity sensors has a slow time constant the deviation of five will be detected before it can change to six.

Figure 3:
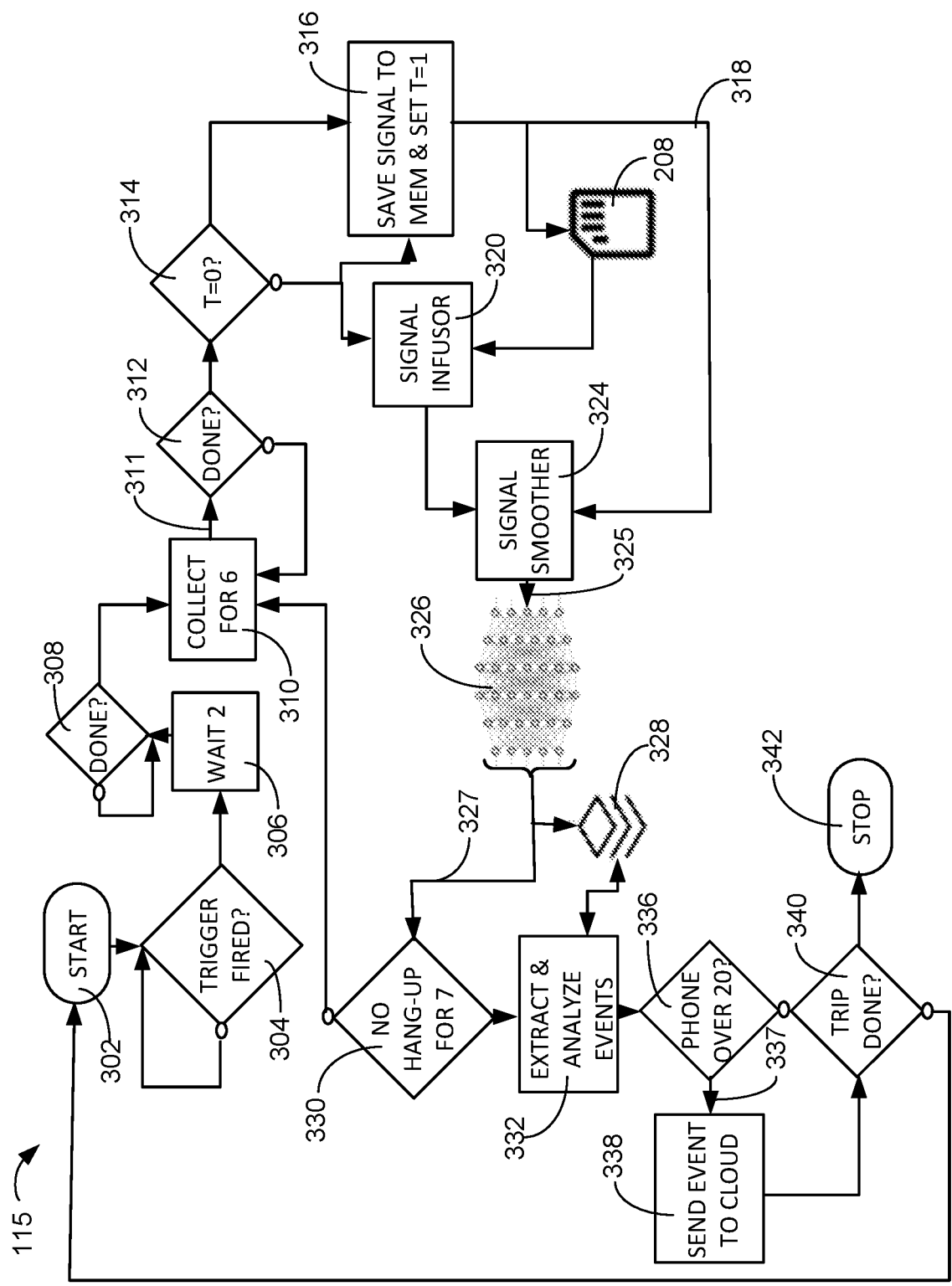
FIG. 3 is an exemplary flow chart of a driver distraction artificial intelligence in an embodiment of the present invention.

Referring now to FIG. 3, therein is shown an exemplary block diagram of the driver distraction artificial intelligence 115 in an embodiment of the present invention. The exemplary block diagram of the driver distraction artificial intelligence 115 depicts a start block 302. The start block 302 can be a entry point for the driver distraction artificial intelligence 115. The start block 302 can be coupled to a trigger detection circuit 304 that can determine that there was movement in the cell phone 203 of FIG. 2. If no trigger is detected, the trigger detection circuit 304 continues to check for one.

If the trigger detection circuit 304 does detect the trigger, it activates a wait 2 second circuit 306, in order to eliminate false triggers. The wait 2 second circuit 306 can be coupled to a wait done block 308 to determine whether the two seconds has elapsed. When the wait 2 second circuit 306 determines that the two second wait has been completed, a collect for 6 circuit 310 can collect sensor data 311 from the phone sensor array 114 of FIG. 1 and the sensor data packet 111 of FIG. 1. While continuously collecting the data from the phone sensor array 114 and the sensor data packet 111, a capture done circuit 312 can count down the six seconds of captured data.

When the data capture is completed, a T=0 check circuit is activated to determine whether this is the first time that the driver distraction artificial intelligence 115 has been activated. Based on the first activation of the driver distraction artificial intelligence 115, a save signal to memory circuit is activated that causes the phone sensor array 114 and the sensor data packet 111 to be stored in the vehicle storage circuit 208. The captured data 318 can be transferred to a signal infusor circuit 320 from the vehicle storage circuit 208.

The captured data 318 can be transferred to a signal smoother circuit 324, where it is combined with the output of the signal infusor circuit 320. The combination of the signals adds hysteresis 325 to the data transferred to a convolutional neural network 326 that was previously trained to detect driver distraction events 327. A prediction stack 328 can be located in the vehicle storage circuit 208 for further processing. The driver distraction events 327 can be checked by a no hang-up for 7 circuit 330, in which the phone sensor array 114 can be scanned to a call complete indication that is present for seven seconds. If the no hang-up for 7 circuit 330 does not detect the call complete indication, the collect for 6 circuit 310 is reactivated to collect additional samples of the sensor data 311 of the phone sensor array 114 and the sensor data packet 111. If the call complete indication is detected, an extract & analyze events circuit 332 is activated. The extract & analyze events circuit 332 can retrieve the driver distraction events 327 from the prediction stack 328 in order to determine whether there was a call on the cell phone 203, a non-call activity, or no usage of the cell phone 203. By way of an example, the non-call activity can include texting, requesting navigation instructions, verbally or through the touch screen, accessing the Internet, or combinations thereof.

A phone over 20 circuit can be activated to determine whether a call on the cell phone 203 lasted over twenty seconds. If the phone over 20 circuit 336 does identify that a call did occur, a send event to cloud circuit 338 can be activated to transfer the event as logged data 337 to the second device 106 of FIG. 1.

A trip done check circuit 340 can determine whether the vehicle 202 is still being operated on the trip. If the trip done check circuit 340 determines that the vehicle 202 is still in operation, the start block 302 is reactivated and the process will recommence. If however, the trip done check circuit 340 determines that the vehicle 202 is no longer in operation, the stop block is activated.

It has been discovered that the compute system 100 can provide the driver distraction artificial intelligence 115 to monitor the phone sensor array 114 and the sensor data packet 111 in order to capture and identify the driver distraction events 327. By analyzing the driver distraction events 327, the driver distraction artificial intelligence 115 can log calls on the cell phone 203, non-call activity of the cell phone 203, and no usage of the cell phone 203 over the course of a trip. The analysis of the driver distraction events 327 can provide an indication of the amount of distraction a driver 112 is subjected to during the trip. This information can be used for training of the driver 112 or evaluation of risk for insurance purposes.

Figure 4:
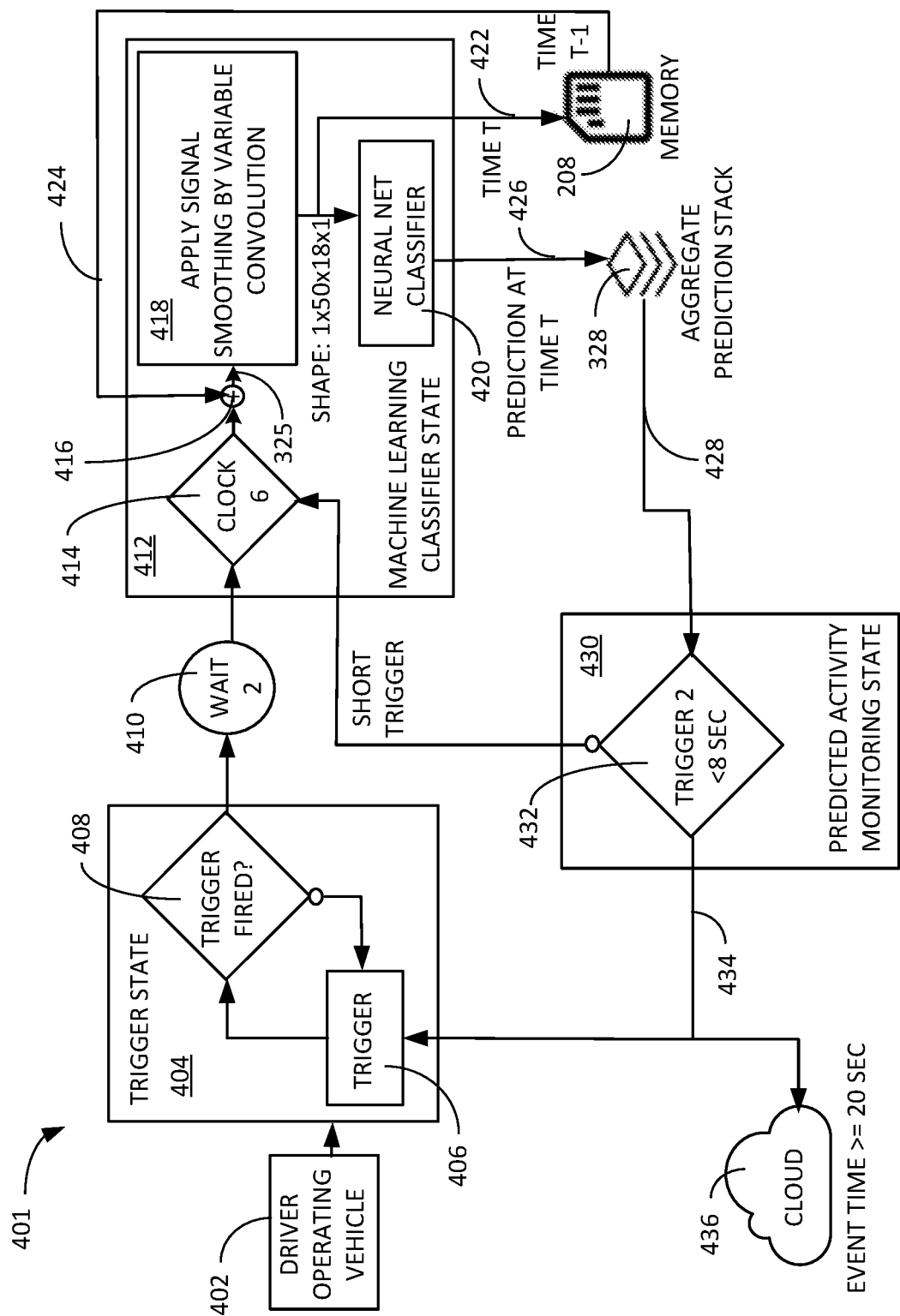
FIG. 4 is an exemplary control flow of the driver distraction detection mechanism processed by the compute system.

Referring now to FIG. 4, therein is shown an exemplary control flow of the driver distraction detection mechanism 401 processed by the compute system 100. The exemplary control flow of the driver distraction detection mechanism 401 depicts a driver process 402, in which the driver 112 of FIG. 1 operates the vehicle 202 of FIG. 2. The driver process 402 being completed, a trigger state 404 is entered. The trigger state 404 includes a trigger detector 406 coupled to a trigger verifier 408. The trigger detector 406 can monitor the position of the cell phone 203 of FIG. 2 through the phone sensor array 114 of FIG. 1. A change in the position of the cell phone 203 indicates a call, a non-call event, or a transient bump. The trigger verifier 408 can eliminate the transient bump and confirm either the call or the non-call event. Once the trigger verifier 408 confirms that the trigger is valid, the process goes to a wait 2 block 410 for a two second delay as a noise reduction delay for non-call and no phone use events, When the wait 2 block 410 has completed, the process enters a machine learning classifier state 412. The machine learning classifier state 412 starts by a clock 6 block 414 collecting the sensor data packet 111 of FIG. 1 and data from the phone sensor array 114 for a six second period. The sensor data 311 of FIG. 3 from the clock 6 block 414 is applied to an adder 416 that combines the current data from time T 107 of FIG. 1 with older data from time T−1 107. The adder 416 can apply hysteresis 325 to the sensor data 311 that is submitted to a signal smoothing block 418.

The signal smoothing block 418 can process the sensor data 311 through the convolutional neural network 326 of FIG. 3 that has been trained to detect a call event, a non-call event, no phone usage, or a combination thereof. By way of an example, the identification of the call event and the non-call event can provide a reason for the driver distraction, but the sensor data packet 111 can quantify the amount of distraction based on wandering in a traffic lane, variations in speed 103 of FIG. 1, proximity to obstructions, or a combination thereof.

The signal smoothing block 418 can segregate the events that are then submitted to a neural network classifier 420 for accounting of the events. The signal smoothing block 418 also stores a time T event 422 in the vehicle storage circuit 208. The vehicle storage circuit 208 also provides a time T−1 event 424 that can be applied to the adder 416. The neural network classifier 420 can provide a time T prediction 426 that is stored in the prediction stack 328 for further analysis.

The prediction stack 328 can provide a sequence of predictions 428 of the event type under analysis. The sequence of predictions 428 can be submitted to a prediction activity monitoring state 430. The prediction activity monitoring state 430 includes a trigger 2 check 432 that monitors for a transition of events. The transition of events can include hanging-up a call, ending a non-call event, or transitioning from phone non-use.

The trigger 2 check 432 can be implemented with the same trigger used to detect movement of the cell phone 203.

Trigger 2 is defined as: $G_t$, $G_{t+\Delta t}$, deviation=5 where $\Delta t$=500 ms $$\left\| \mathrm{Sin}^{-1}\left(\frac{-G_{t+\Delta t}^z}{g}\right) \right| - \left| \mathrm{Sin}^{-1}\left(\frac{-G_t^z}{g}\right) \right\| > \mathrm{deviation} \qquad (EQ3)$$

The release of the cell phone 203 can be determined by monitoring only the gravity sensor of the Z-axis, as shown above.

If the trigger 2 check 432 does not detect one of the transition events, the flow returns to the clock 6 block 414 to collect an additional six seconds of the sensor data packet 111 and the sensor data 311 from the phone sensor array 114. If the trigger 2 check 432 identifies a detected event 434 as one of the transition events, the flow returns to the trigger detector 406 to start the flow again. When the detected event 434 has a duration in excess of 20 seconds, the detected event 434 is sent to a cloud 436, such as the second device 106 of FIG. 1.

It has been discovered that the driver distraction detection mechanism 401 can monitor the sensor data packet 111 and the sensor data 311 from the phone sensor array 114 to determine the presence and degree of the driver distraction experienced by the driver 112 of FIG. 1. By monitoring the movement of the cell phone 203 an event can be predicted to be a call, a non-call event, or non-use of the cell phone 203. Once an event related to the cell phone 203 is detected, the degree of distraction can be determined by monitoring the lane position of the vehicle 202 of FIG. 2, variation in the speed 103, and proximity to any obstructions. The result can be used for education of the driver 112 or assessment of the driver's ability to resist distraction for insurance purposes.

Figure 5:
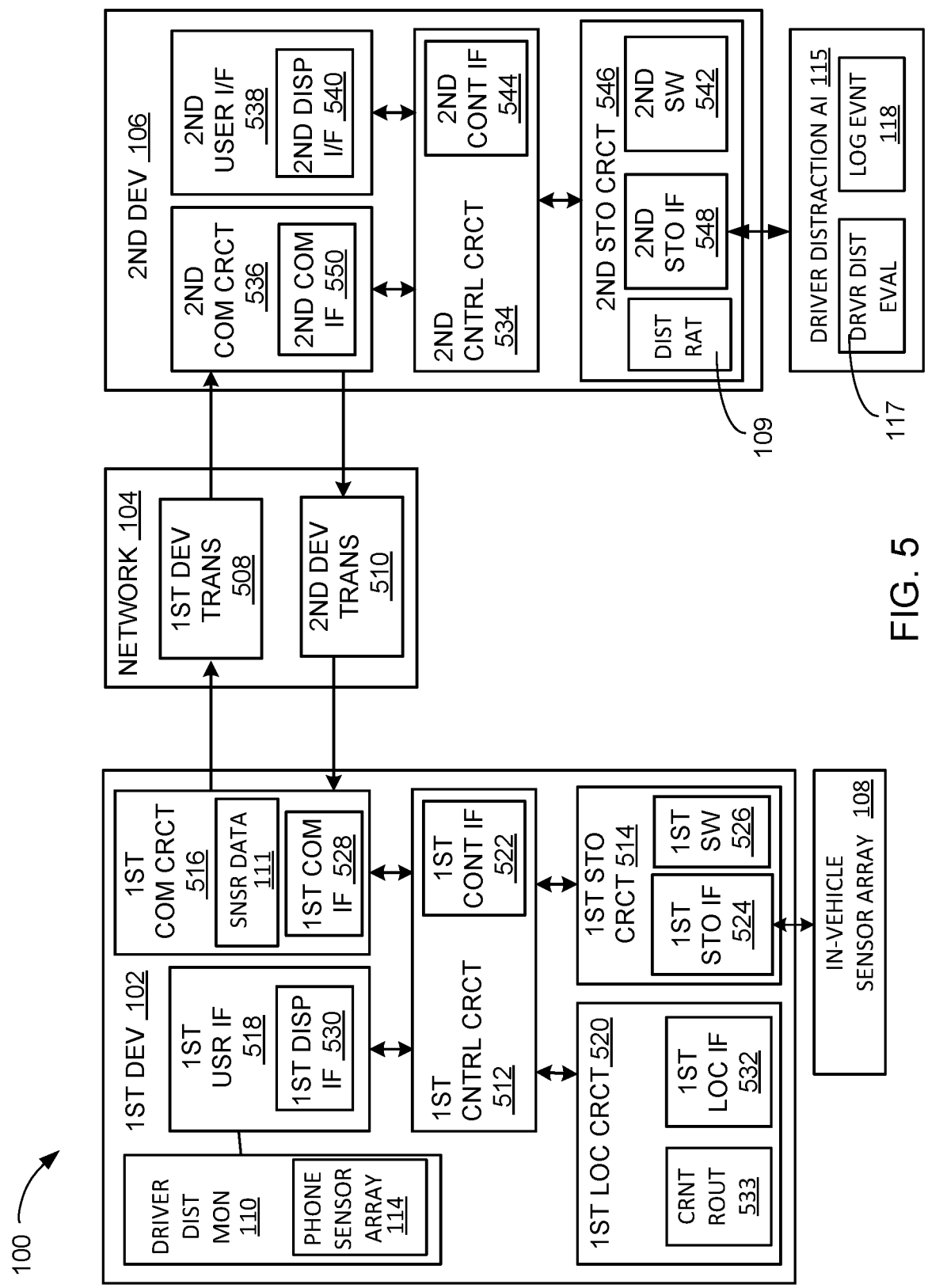
FIG. 5 is an exemplary block diagram of the compute system.

Referring now to FIG. 5, therein is shown an exemplary block diagram of the compute system 100 of FIG. 1. The compute system 100 can include the first device 102, the network 104, and the second device 106. The first device 102 can send information in a first device transmission 508 over the network 104 to the second device 106. The second device 106 can send information in a second device transmission 510 over the network 104 to the first device 102.

For illustrative purposes, the compute system 100 is shown with the first device 102 as a client device, although it is understood that the compute system 100 can include the first device 102 as a different type of device including the vehicle 202 of FIG. 2. For example, the first device 102 can be a server containing a display interface.

Also, for illustrative purposes, the compute system 100 is shown with the second device 106 as a server, although it is understood that the compute system 100 can include the second device 106 as a different type of device. For example, the second device 106 can be a client device.

Also, for illustrative purposes, the compute system 100 is shown with interaction between the first device 102 and the second device 106. However, it is understood that the first device 102 can similarly interact with the vehicle 202 of FIG. 2. Similarly, the second device 106 can similarly interact with the vehicle 202.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 512, a first storage circuit 514, a first communication circuit 516, a first user interface 518, and a first location circuit 520. The first control circuit 512 can include a first control interface 522. The first control circuit 512 can execute a first software 526 to provide the intelligence of the compute system 100 to enable the in-vehicle sensor array 108 of FIG. 1, transfer the sensor data packet 111, and calculate the distraction rating 109 of FIG. 1.

The first control circuit 512 can be implemented in a number of different manners. For example, the first control circuit 512 can be a processor, an application specific integrated circuit (ASIC) an embedded processor, a microprocessor, a hardware control logic, a hardware finite state machine (FSM), a digital signal processor (DSP), or a combination thereof. The first control interface 522 can be used for communication between the first control circuit 512 and other functional units or circuits in the first device 102. The first control interface 522 can also be used for communication that is external to the first device 102.

The first control interface 522 can receive information from the other functional units/circuits or from external sources, or can transmit information to the other functional units/circuits or to external destinations. The external sources and the external destinations refer to sources and destinations external to the first device 102.

The first control interface 522 can be implemented in different ways and can include different implementations depending on which functional units/circuits or external units/circuits are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The first storage circuit 514 can store the first software 526. The first storage circuit 514 can also store the relevant information, such as sensor data 311 of FIG. 3 representing the phone sensor array 114 of FIG. 1, the sensor data packet 111, the distraction rating 109, the time T event 422 of FIG. 4, or a combination thereof.

The first storage circuit 514 can be a volatile memory, a nonvolatile memory, an internal memory, an external memory, or a combination thereof. For example, the first storage circuit 514 can be a nonvolatile storage such as non-volatile random access memory (NVRAM), Flash memory, disk storage, or a volatile storage such as static random access memory (SRAM).

The first storage circuit 514 can include a first storage interface 524. The first storage interface 524 can be used for communication between the first storage circuit 514 and other functional units or circuits in the first device 102, such as the in-vehicle sensor array 108, the first control circuit 512, the first communication circuit 516, or a combination thereof. The first storage interface 524 can also be used for communication that is external to the first device 102.

The first storage interface 524 can receive information from the other functional units/circuits or from external sources, or can transmit information to the other functional units/circuits or to external destinations. The external sources and the external destinations refer to sources and destinations external to the first device 102.

The first storage interface 524 can include different implementations depending on which functional units/circuits or external units/circuits are being interfaced with the first storage circuit 514. The first storage interface 524 can be implemented with technologies and techniques similar to the implementation of the first control interface 522.

The first communication circuit 516 can enable external communication to and from the first device 102. For example, the first communication circuit 516 can permit the first device 102 to communicate with the second device 106, an attachment, such as a peripheral device or a desktop computer, and the network 104.

The first communication circuit 516 can also function as a communication hub allowing the first device 102 to function as part of the network 104 and not limited to be an end point or terminal circuit to the network 104. The first communication circuit 516 can include active and passive components, such as microelectronics or an antenna, for interaction with the network 104.

The first communication circuit 516 can include a first communication interface 528. The first communication interface 528 can be used for communication between the first communication circuit 516 and other functional units or circuits in the first device 102. By way of an example the first communication circuit 516 can retrieve the sensor data packet 111, from the in-vehicle sensor array 108, through the first storage interface 524 in order to transmit it to the second device 106 for further processing and analysis. The first communication interface 528 can receive information from the second device 106, including the distraction rating 109, for distribution to the other functional units/circuits or can transmit information to the other functional units or circuits.

The first communication interface 528 can include different implementations depending on which functional units or circuits are being interfaced with the first communication circuit 516. The first communication interface 528 can be implemented with technologies and techniques similar to the implementation of the first control interface 522.

The first user interface 518 allows the user 112 of FIG. 1 to interface and interact with the first device 102 through the phone sensor array 114. The first user interface 518 can include an input device and an output device that can operate through the phone sensor array 114. Examples of the input device of the first user interface 518 can include a keypad, a touchpad, soft-keys, a keyboard, a microphone, an infrared sensor for receiving remote signals, or any combination thereof to provide data and communication inputs. By way of an example, the driver distraction monitor 110 of FIG. 1 can be input to the first user interface 518 through a wireless audio connection. The first user interface 518 can pass the input from the phone sensor array 114 to the first control circuit 112 for processing and storage.

The first user interface 518 can include a first display interface 530. The first display interface 530 can include an output device. The first display interface 530 can include a display, a projector, a video screen, a speaker, or any combination thereof.

The first control circuit 512 can operate the first user interface 518 to display information generated by the compute system 100, such as the distraction rating 109 of the driver 112, or enable the audio interactions 124 of FIG. 1. The first control circuit 512 can also execute the first software 526 for the other functions of the compute system 100, including receiving location information from the first location circuit 520 and logging a current route 533. The first control circuit 512 can further execute the first software 526 for interaction with the network 104 via the first communication circuit 516.

The first control circuit 512 can operate the first user interface 518 to collect the data from the user 112 in the form of the user response 122, including point-of-interest requests, service requests, accommodation requests, cell phone activation requests, or combinations thereof. The first control circuit 512 can also receive location information from the first location circuit 520. The first control circuit 512 can compile the sensor data packet 111, including the location data from the first location circuit 520, time 107 of FIG. 1, and the data from the current route 533. The first control circuit 512 can send the sensor data packet 111 and the sensor data 311 from the phone sensor array 114, through the first communication circuit 516, to the second device 106 for processing.

The first location circuit 520 can generate location information, current heading, current acceleration, and current speed 103 of FIG. 1 of the first device 102, as examples. The first location circuit 520 can be implemented in many ways. For example, the first location circuit 520 can function as at least a part of the global positioning system, an inertial navigation system, a cellular-tower location system, a pressure location system, or any combination thereof. Also, for example, the first location circuit 520 can utilize components such as an accelerometer or global positioning system (GPS) receiver. The first location circuit 520 can provide distancing information to the first control circuit 512 for calculating pseudo ranges for the global positioning system or the cell-tower location system.

The first location circuit 520 can include a first location interface 532. The first location interface 532 can be used for communication between the first location circuit 520 and other functional units or circuits in the first device 102. The first location interface 532 can also be used for communication external to the first device 102.

The first location interface 532 can receive information from the other functional units/circuits or from external sources, or can transmit information to the other functional units/circuits or to external destinations. The external sources and the external destinations refer to sources and destinations external to the first device 102.

The first location interface 532 can include different implementations depending on which functional units/circuits or external units/circuits are being interfaced with the first location circuit 520. The first location interface 532 can be implemented with technologies and techniques similar to the implementation of the first control circuit 512. It is understood that the first location circuit 520 and the first location interface 532 are a part of or can be integrated into the first device 102, the vehicle 202, or a combination thereof.

The second device 106 can be optimized for implementing an embodiment of the present invention in a multiple device embodiment with the first device 102. The second device 106 can provide the additional or higher performance processing power compared to the first device 102. The second device 106 can include a second control circuit 534, a second communication circuit 536, a second user interface 538, and a second storage circuit 546.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control circuit 534 can receive the sensor data packet 111 through the second communication circuit 536. The second control circuit can verify the content of the sensor data packet 111 and the sensor data 311 from the phone sensor array 114 to generate the distraction rating 109. Once the distraction rating 109 is prepared for transfer to the first device 102, the second communication circuit can transfer the distraction rating 109 through the second device transfer 510.

The second control circuit 534 can execute a second software 542 to provide the intelligence of the second device 106 of the compute system 100. The second software 542 can operate in conjunction with the first software 526. The second control circuit 534 can provide additional performance compared to the first control circuit 512.

The second control circuit 534 can operate the second user interface 538 to display information. The second control circuit 534 can also execute the second software 542 for the other functions of the compute system 100, including operating the second communication circuit 536 to communicate with the first device 102 over the network 104.

The second control circuit 534 can be implemented in a number of different manners. For example, the second control circuit 534 can be a processor, an embedded processor, a microprocessor, hardware control logic, a hardware finite state machine (FSM), a digital signal processor (DSP), or a combination thereof.

The second control circuit 534 can include a second control interface 544. The second control interface 544 can be used for communication between the second control circuit 534 and other functional units or circuits in the second device 106. The second control interface 544 can also be used for communication that is external to the second device 106.

The second control interface 544 can receive information from the other functional units/circuits or from external sources, or can transmit information to the other functional units/circuits or to external destinations. The external sources and the external destinations refer to sources and destinations external to the second device 106.

The second control interface 544 can be implemented in different ways and can include different implementations depending on which functional units/circuits or external units/circuits are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, or a combination thereof.

The second storage circuit 546 can store the second software 542. The second storage circuit 546 can also store the information such as data representing incoming events, data representing activities of the cell phone 203 of FIG. 2, sound files, or a combination thereof. The second storage circuit 546 can be sized to provide the additional storage capacity to supplement the first storage circuit 514.

For illustrative purposes, the second storage circuit 546 is shown as a single element, although it is understood that the second storage circuit 546 can be a distribution of storage elements. Also, for illustrative purposes, the compute system 100 is shown with the second storage circuit 546 as a single hierarchy storage system, although it is understood that the compute system 100 can include the second storage circuit 546 in a different configuration. For example, the second storage circuit 546 can be formed with different storage technologies forming a memory hierarchal system including different levels of caching, main memory, rotating media, or off-line storage.

The second storage circuit 546 can be a volatile memory, a nonvolatile memory, an internal memory, an external memory, or a combination thereof. For example, the second storage circuit 546 can be a nonvolatile storage such as non-volatile random access memory (NVRAM), Flash memory, disk storage, or a volatile storage such as static random access memory (SRAM).

The second storage circuit 546 can include a second storage interface 548. The second storage interface 548 can be used for communication between the second storage circuit 546 and other functional units or circuits in the second device 106. The second storage interface 548 can also be used for communication that is external to the second device 106, such as the driver distraction artificial intelligence 115, which can perform the driver distraction evaluation 117 and manage the logging event 118.

The second storage interface 548 can receive information from the other functional units/circuits or from external sources, or can transmit information to the other functional units/circuits or to external destinations. The external sources and the external destinations refer to sources and destinations external to the second device 106.

The second storage interface 548 can include different implementations depending on which functional units/circuits or external units/circuits are being interfaced with the second storage circuit 546. The second storage interface 548 can be implemented with technologies and techniques similar to the implementation of the second control interface 544.

The second communication circuit 536 can enable external communication to and from the second device 106. For example, the second communication circuit 536 can permit the second device 106 to communicate with the first device 102 over the network 104. By way of an example, the second device 106 can provide the distraction rating 109 to the first device 102 in response to the driver distraction event 327 of FIG. 3 of the user 112.

The second communication circuit 536 can also function as a communication hub allowing the second device 106 to function as part of the network 104 and not limited to be an end point or terminal unit or circuit to the network 104. The second communication circuit 536 can include active and passive components, such as microelectronics or an antenna, for interaction with the network 104.

The second communication circuit 536 can include a second communication interface 550. The second communication interface 550 can be used for communication between the second communication circuit 536 and other functional units or circuits in the second device 106. The second communication interface 550 can receive information from the other functional units/circuits or can transmit information to the other functional units or circuits.

The second communication interface 550 can include different implementations depending on which functional units or circuits are being interfaced with the second communication circuit 536. The second communication interface 550 can be implemented with technologies and techniques similar to the implementation of the second control interface 544.

The first communication circuit 516 can couple with the network 104 to send the sensor data packet 111 including the current route 113 to the second device 106 in the first device transmission 508. The second device 106 can receive information in the second communication circuit 536 from the first device transmission 508 of the network 104.

The second communication circuit 536 can couple with the network 104 to send information to the first device 102 in the second device transmission 510. The first device 102 can receive information in the first communication circuit 516 from the second device transmission 510 of the network 104. The compute system 100 can be executed by the first control circuit 512, the second control circuit 534, or a combination thereof. For illustrative purposes, the second device 106 is shown with the partition containing the second user interface 538, the second storage circuit 546, the second control circuit 534, and the second communication circuit 536, although it is understood that the second device 106 can include a different partition. For example, the second software 542 can be partitioned differently such that some or all of its function can be in the second control circuit 534 and the second communication circuit 536. Also, the second device 106 can include other functional units or circuits not shown in FIG. 5 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

For illustrative purposes, the compute system 100 is described by operation of the first device 102 and the second device 106. It is understood that the first device 102 and the second device 106 can operate any of the modules and functions of the compute system 100.

By way of a further example, the first device 102 can be the vehicle 202. The first user interface 518 can receive input from the location-movement sensor 212 of FIG. 2, the visual sensor 214 of FIG. 2, such as the high-definition camera sensor 214 of FIG. 2, the radar sensor 216 of FIG. 2, the accessory sensor 218 of FIG. 2, or the combination thereof for compiling the sensor data packet 111. The sensor data packet 111 can be generated by the first control circuit 512 from the location-movement sensor 212, the visual sensor 214, such as the high-definition camera sensor 214, the radar sensor 216, the accessory sensor 218, or the combination thereof. The sensor data packet 111 can be sent through the first communication circuit 516 and the network 104 to the second device 106 for incorporation in the distraction rating 109.

It has been discovered that the first device 102 can transmit the sensor data packet 111 and the sensor data 311 from the phone sensor array 114 to the second device 106 for evaluation of the distraction rating 109. The first control unit 512 can operate the driver distraction monitor 110 to manage the sensor data 311 from the phone sensor array 114 in the communication between the user 112 and the compute system 100 through the audio interaction 124 or physical contact with the cell phone 203. By monitoring the sensor data packet 111 and the sensor data 311 from the phone sensor array 114 to develop the distraction rating 109, the user 112 can be alerted, by a display and an alert through the audio interaction 124, to excessive distraction that can cause mistakes or accidents due to distraction of the user 112.

Figure 6:
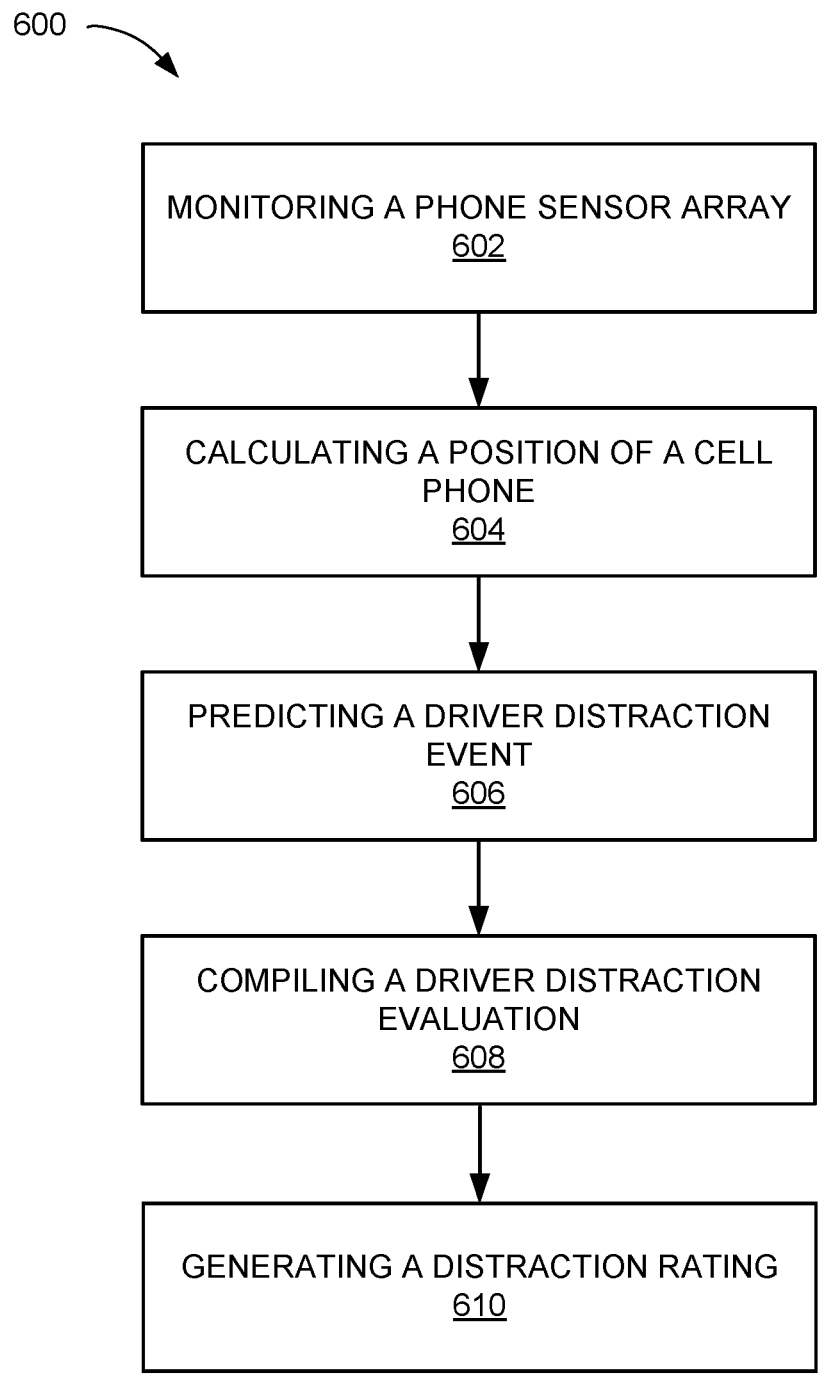
FIG. 6 is a flow chart of a method of operation of a compute system in an embodiment of the present invention.

Referring now to FIG. 6, therein is shown a flow chart of a method 600 of operation of a compute system 100 of FIG. 1 in an embodiment of the present invention. The method 600 includes: monitoring a phone sensor array to detect a trigger in block 602; calculating a position of a cell phone based on the trigger and sensor data from the phone sensor array in a block 604; predicting a driver distraction event by analysis of the sensor data and the position of the cell phone in a block 606; compiling a driver distraction evaluation based on the driver distraction event and a sensor data packet from an in-vehicle sensor array in a block 608; and generating a distraction rating for display on a device based on the driver distraction evaluation in a block 610.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation for a compute system comprising:
    monitoring a phone sensor array to detect a trigger;
    calculating a position of a cell phone based on the trigger and sensor data from the phone sensor array;
    predicting a driver distraction event by analyzing the sensor data and the position of the cell phone;
    compiling a driver distraction evaluation based on the driver distraction event and a sensor data packet from an in-vehicle sensor array; and
    generating a distraction rating for display on a device based on the driver distraction evaluation.

2. The method as claimed in claim 1 wherein predicting the driver distraction event includes detecting an audio interaction or a physical contact with the cell phone.

3. The method as claimed in claim 1 further compromising monitoring a passenger by the phone sensor array to increase the distraction rating of a driver in response to the driver distraction event.

4. The method as claimed in claim 1 further compromising adding a hysteresis to the sensor data includes adding a time T−1 event to a time T of the sensor data.

5. The method as claimed in claim 1 further comprising monitoring an audio interaction includes capturing a time of the audio interaction for calculating the driver distraction event.

6. The method as claimed in claim 1 wherein compiling the driver distraction evaluation includes identifying a time of the driver distraction event with a variation of speed of the device from the sensor data packet.

7. The method as claimed in claim 1 wherein predicting the driver distraction event includes smoothing a captured data for analysis by a driver distraction artificial intelligence, pre-trained.

8. A compute system comprising:
    a control circuit configured to:
    monitor a phone sensor array to detect a trigger;

calculate a position of a cell phone based on the trigger and sensor data from the phone sensor array;
predict a driver distraction event by analysis of the sensor data and the position of the cell phone;
compile a driver distraction evaluation based on the driver distraction event and a sensor data packet from an in-vehicle sensor array; and
generate a distraction rating for display on a device based on the driver distraction evaluation.

9. The system as claimed in claim 8 wherein the control circuit is configured to predict the driver distraction event includes a driver distraction monitor detects an audio interaction or a physical contact with the cell phone.

10. The system as claimed in claim 8 further comprising a passenger monitored by the phone sensor array to increase the distraction rating of a driver in response to the driver distraction event.

11. The system as claimed in claim 8 wherein the control circuit is configured to add a hysteresis to the sensor data includes an adder combining a time T−1 event to the time T sensor data.

12. The system as claimed in claim 8 further comprising an audio interaction monitored includes a driver distraction monitor captures a time of the audio interaction for calculation of the driver distraction event.

13. The system as claimed in claim 8 wherein the control circuit is configured to compile the driver distraction evaluation includes a time of the driver distraction event identified with a variation of speed of the device from the sensor data packet.

14. The system as claimed in claim 8 wherein the control circuit is configured to predict the driver distraction event includes smoothing a captured data for analysis by a driver distraction artificial intelligence, pre-trained.

15. A non-transitory computer readable medium including instructions for a navigation system comprising:

monitoring a phone sensor array to detect a trigger;
calculating a position of a cell phone based on the trigger and sensor data from the phone sensor array;
predicting a driver distraction event by analyzing the sensor data and the position of the cell phone;
compiling a driver distraction evaluation based on the driver distraction event and a sensor data packet from an in-vehicle sensor array; and
generating a distraction rating for display on a device based on the driver distraction evaluation.

16. The non-transitory computer readable medium including the instructions as claimed in claim 15 wherein predicting the driver distraction event includes detecting an audio interaction or a physical contact with the cell phone.

17. The non-transitory computer readable medium including the instructions as claimed in claim 15 further comprising monitoring a passenger by the phone sensor array to increase the distraction rating of a driver in response to the driver distraction event.

18. The non-transitory computer readable medium including the instructions as claimed in claim 15 further comprising adding a hysteresis to the sensor data includes adding a time T−1 event to the time T sensor data.

19. The non-transitory computer readable medium including the instructions as claimed in claim 15 further comprising monitoring an audio interaction includes capturing a time of the audio interaction for calculating the driver distraction event.

20. The non-transitory computer readable medium including the instructions as claimed in claim 15 wherein compiling the driver distraction evaluation includes identifying a time of the driver distraction event with a variation of speed of the device from the sensor data packet.

* * * * *